(12) United States Patent
Zhang et al.

(10) Patent No.: US 11,074,139 B2
(45) Date of Patent: Jul. 27, 2021

(54) DYNAMIC BLOCK CHAIN SYSTEM USING METADATA FOR BACKING UP DATA BASED ON DIGEST RULES

(71) Applicant: EMC IP Holding Company LLC, Hopkinton, MA (US)

(72) Inventors: Simon Yuting Zhang, Chengdu (CN); Yizhou Zhou, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 34 days.

(21) Appl. No.: 16/288,102

(22) Filed: Feb. 28, 2019

(65) Prior Publication Data

US 2020/0117550 A1    Apr. 16, 2020

(30) Foreign Application Priority Data

Oct. 12, 2018 (CN) .......................... 201811192091.8

(51) Int. Cl.
*G06F 11/14* (2006.01)
*H04L 9/06* (2006.01)
*G06F 21/60* (2013.01)

(52) U.S. Cl.
CPC ........ *G06F 11/1464* (2013.01); *H04L 9/0637* (2013.01); *H04L 9/0643* (2013.01); *G06F 21/60* (2013.01); *H04L 2209/38* (2013.01)

(58) Field of Classification Search
CPC ............... G06F 11/1469; G06F 16/172; G06F 11/1464; G06F 21/60
See application file for complete search history.

(56) References Cited

U.S. PATENT DOCUMENTS

| | | | |
|---|---|---|---|
| 7,395,284 B2 * | 7/2008 | Sato .................... | G06F 11/1456 |
| 10,476,668 B2 * | 11/2019 | McCurry ................ | G06F 21/16 |
| 10,944,558 B2 * | 3/2021 | Lu ............................ | G09C 1/00 |
| 2012/0215746 A1 * | 8/2012 | Auchmoody ........... | G06F 16/10 707/674 |

* cited by examiner

*Primary Examiner* — Tammara R Peyton
(74) *Attorney, Agent, or Firm* — Womble Bond Dickinson (US) LLP (57) ABSTRACT

Embodiments of the present disclosure provide a method, a device and a computer program for data backup. A method of backing up data comprises: in response to receiving, from an application system, a request for backing up first data, storing the first data into a first backup node; generating first metadata corresponding to the first data, the first metadata comprising first digest information of the first data; storing the first metadata into a block chain system to which the first backup node belongs; and verifying integrity of the first data stored in the first backup node with the first metadata stored in the block chain system. By utilizing a block chain system, the embodiments of the present disclosure ensure that data backed up are protected from being tampered with.

19 Claims, 4 Drawing Sheets

Fig. 8

DYNAMIC BLOCK CHAIN SYSTEM USING METADATA FOR BACKING UP DATA BASED ON DIGEST RULES

CROSS-REFERENCE TO RELATED APPLICATION

This patent application claims priority, under 35 U.S.C. § 119, of Chinese Patent Application No. 201811192091.8, filed Oct. 12, 2018, entitled "METHOD, DEVICE AND COMPUTER PROGRAM PRODUCT FOR BACKING UP DATA," which is incorporated by reference herein in its entirety.

FIELD

Embodiments of the present disclosure generally relate to the field of data storage, and more specifically, to a method, a device and a computer program product for backing up data.

BACKGROUND

With development of computer technologies, a security management technology has been widely applied to managing various types of application systems. In the various application environments, it is often required to perform a backup operation for data in an application system, such that the application system can be recovered based on backup data when a failure occurs in the application system, or in other cases. Since the backup data serve as a basis for recovering the application system, how the backup data of the application system is managed in a safer and more reliable manner becomes a research focus.

SUMMARY

Embodiments of the present disclosure provide a method, a device and a computer program product for backing up data.

In a first aspect of the present disclosure, there is provided a method of data backup. The method comprises: in response to receiving, from an application system, a request for backing up first data, storing the first data into a first backup node; generating first metadata corresponding to the first data, the first metadata comprising first digest information of the first data; storing the first metadata into a block chain system to which the first backup node belongs; and verifying integrity of the first data stored in the first backup node with the first metadata stored in the block chain system.

In a second aspect of the present disclosure, there is provided a device for data backup. The device comprises at least one processing unit and at least one memory. The at least one memory is coupled to the at least one processing unit and stores instructions which, when executed by the at least one processing unit causes the device to perform acts comprising: in response to receiving, from an application system, a request for backing up first data, storing the first data into a first backup node; generating first metadata corresponding to the first data, the first metadata comprising first digest information of the first data; storing the first metadata into a block chain system to which the first backup node belongs; and verifying integrity of the first data stored in the first backup node with the first metadata stored in the block chain system.

In a third aspect of the present disclosure, there is provided a computer program product. The computer program product is tangibly stored in a non-transient computer storage medium and comprises machine-executable instructions. The machine-executable instructions which, when executed by a device, causes the device to perform any step of the method as described in the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent, through the following detailed description of the example embodiments of the present disclosure with reference to the accompanying drawings, in which the same reference symbols generally refer to the same elements.

Throughout the drawings, the same or similar reference symbols refer to the same or similar elements.

DETAILED DESCRIPTION OF EMBODIMENTS

Preferred embodiments of the present disclosure will now be described in detail with reference to the accompanying drawings. Although the drawings illustrate preferred embodiments of the present disclosure, it would be appreciated that the present disclosure may be implemented in various manners but should not be construed as being limited by the embodiments illustrated herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one embodiment" and "the embodiment" are to be read as "at least one embodiment." The term "another embodiment" is to be read as "at least another embodiment." The terms "first," "second," and the like may refer to different or the same objects. Other definitions, either explicit or implicit, may be included below.

As described above, in various application environments, it is often required to perform a backup operation for data in an application system, such that the application system can be recovered based on backup data when a failure occurs in the application system, or in other cases. Since backup data serve as a basis for recovering an application system, the backup data of an application system should be managed in a safe and reliable manner.

The legacy data backup solutions typically include two types: the first one is replicating data to other sites so as to obtain a plurality of copies of the data; and the second one is establishing an isolated environment with a physical connection restriction and then replicating data to an isolated recovery point. However, the two types of solutions have their own problems. For example, for the first type of solution, it is still possible for a hacker to hack a replication site to destroy or encrypt data. For the second type of solution, it is necessary to regularly enable a network connection manually to trigger data replication. This may cause a great delay from sending to responding of data backup request, and manual operations probably result in other errors.

Embodiments of the present disclosure provide a solution for backing up data, so as to solve the above problems and one or more of other potential problems. According to the solution, metadata corresponding to backup data is stored in a block chain system, thereby ensuring that the metadata is not tampered with. In addition, in a procedure of performing integrity verification to the backup data with the metadata, a part of computing tasks is completed by other nodes in the block chain system, thereby saving local computing resources and improving efficiency for verification of integrity of data.

Figure 1:
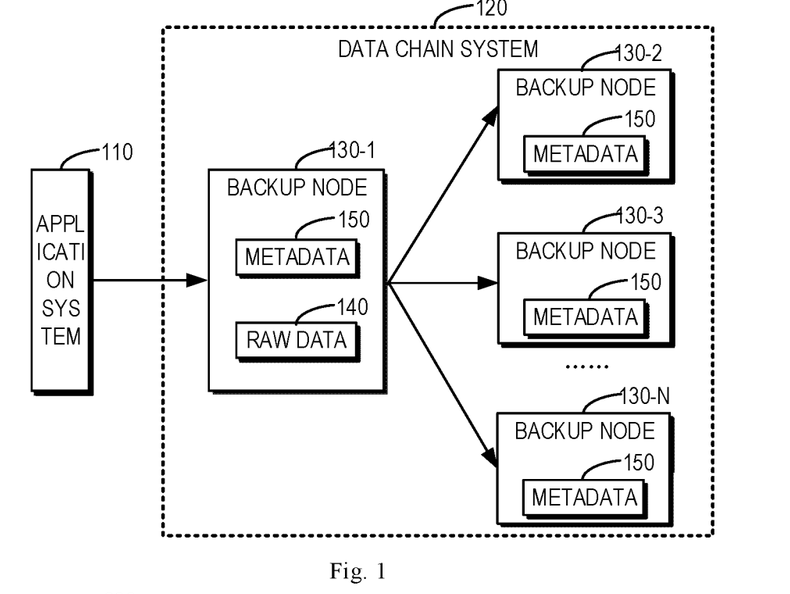
FIG. 1 illustrates a schematic diagram of an example backup system according to embodiments of the present disclosure.

FIG. 1 illustrates a schematic diagram of an example backup system 100 according to embodiments of the present disclosure. As shown in FIG. 1, the system 100 may include an application system 110 and a plurality of backup nodes 130-1, 130-2 . . . 130-N (which are collectively referred to as backup node 130). It would be appreciated that the structure and the functionality of the example system 100 as shown in FIG. 1 are provided merely as an example, without implying any limitation to the scope of the present disclosure.

The application system 100 may be a system for implementing various functionalities. For example, the application system 110 may be a data storage system, an operation system, a game system or a system for implementing other functionalities. With a data storage system as an example, details of each implementation related to management of the application system 110 will be described below. In order to improve reliability of the application system 110, a backup operation may be performed for the application system 110. For example, when the application system 110 is a storage system, the backup operation may be performed for various files, data sheets or other objects in the storage system.

The backup node 130 is also referred to as a backup server, which may be a physical or a virtual computer running specific data protection software. With the backup node 130-1 as an example, it may back up data from the application system 110 at different time points, for example. As shown in FIG. 1, the backup data stored by the backup node 130-1 may generally include raw data 140 and corresponding metadata 150.

In some embodiments, the raw data 140 may be unmodified data to be backed up by the application system 110. For example, it can include data contained in a raw file to be backed up or data contained in an object. Alternatively, the raw data 140 may also be data obtained after performing compression, encryption and/or other pre-processing for data to be backed up by the application system 110.

In some embodiments, the metadata 150, for example, may record information associated with the raw data 140, including, but not limited to, a file structure, an attribute, access information, a checksum and the like. Particularly, in some embodiments, the metadata 150 may include digest information of the raw data 140, and the digest information, for example, may be generated based on a predetermined digest rule and may be used to determine whether the raw data 140 is tampered with. Generation and utilization of the digest information will be further described below.

In some embodiments, the backup node 130-1 may support deduplication backup, i.e., there is no repeated data stored in the raw data 140 do not include. In this case, when backing up is performed a plurality of times for the application system 110, respective metadata 150 may be generated for each performing of backup. That is, there may be respective metadata 150 corresponding to the plurality of times of backups at the backup node 130-1. For the purpose of illustration and simplification, FIG. 1 only shows one metadata 150. However, it would be appreciated that this is only for the purpose of illustration, not intending to limit the scope of the present disclosure.

For the data backup system 100, integrity of the backup data is importance. Data integrity refers to that data must be reliable and accurate in the entire life cycle thereof. In order to accomplish this objective, it is required to perform data integrity check regularly in the data backup system, and for example, it is determined whether the raw data 140 is tampered with, using the digest information in the metadata 150. However, both the raw data 140 and the metadata 150 are probably altered by a hacker. Although the digest information in the metadata 150 may be used to verify the integrity of the raw data 140, the verification is probably inaccurate if the metadata 150 is altered per se.

In some embodiments, in order to ensure security of the backup data in the backup node 130-1, the backup node 130-1 may form a block chain system 120, together with one or more of other backup nodes 130-2, 130-3 . . . 130-N. In some embodiments, as shown in FIG. 1, the backup node 130-1 may send the metadata 150 (for example, after being compressed and/or encrypted) to each of one or more backup nodes 130-2, 130-3 . . . 130-N, to store a copy of the metadata 150 in these backup nodes.

The block chain system 120 is also referred to as a "block chain network" or a "data protection network (DPN)" herein. In the block chain system 120, the backup nodes 130 are coupled to one another communicatively. For example, each node 130 may run data protection programs supporting the same specific protocol, and thus is capable of communicating with other nodes 130. Each backup node 130 has a ledger for recording the stored metadata. Moreover, each backup node 130 stores metadata for other backup nodes 130, in addition to storing its own metadata. In the block chain system 120, a consensus algorithm, such as a proof of work (POW) algorithm or the like, may be used to make the records in all of the ledgers of the backup nodes 130 the same. Whenever a new backup node is configured and enabled, the backup node can join the block chain system 120 automatically because it runs data protection programs supporting the same specific protocol. Since the block chain system 120 is tamper-resistant, it can ensure the metadata 150 from being tampered with and it is authentic. Then, the authentic metadata 150 may be used to verify integrity of the raw data 140.

Figure 2:
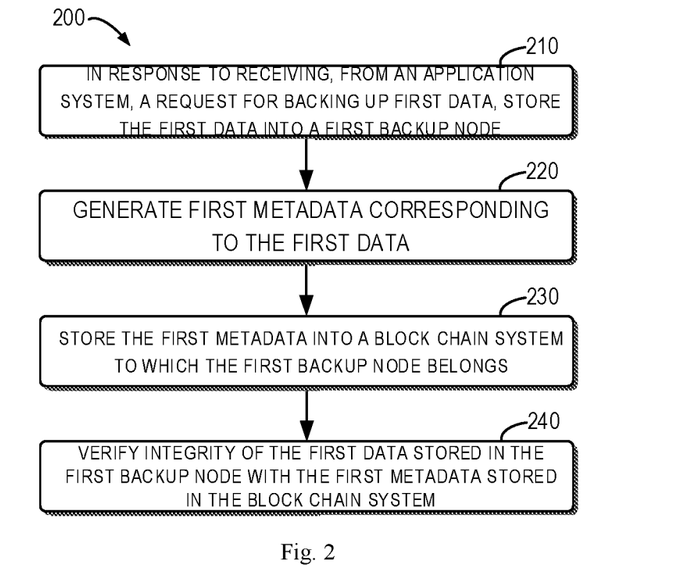
FIG. 2 illustrates a flowchart of an example method of backing up data according to embodiments of the present disclosure.

Various details of the embodiments of the present disclosure will be further described within reference to the drawings. FIG. 2 illustrates a flow chart of an example method 200 of backing up data according to embodiments of the present disclosure. For example, the method 200 can be performed by the backup node 130-1 as shown in FIG. 1. It would be appreciated that the method 200 may include additional acts not shown and/or skip the acts as shown, and the scope of the present disclosure is not limited in this aspect. The method 200 will be described in detail with reference to FIG. 1. Hereinafter, the backup node 130-1 is sometimes referred to as a "first backup node," the raw data 140 is sometimes referred to as "first data," and metadata 150 are also referred to as "first metadata."

At block 210, in response to receiving, from the application system 110, a request for backing up first data, the first data is stored into the backup node 130-1.

In some embodiments, as described above, the first data may be stored as the raw data 140 as shown in FIG. 1, in a deduplication manner. In some embodiments, the first data may be data having not subjected to any processing and included in the original file or object to be backed up by the application system 110. Alternatively, in some embodiments, the first data may also be data obtained after performing compression, encryption and/or other pre-processing for the data included in the original file or object to be backed up by the application system 110.

At block 220, the backup node 130-1 generates first metadata (i.e., the metadata 150) corresponding to the first data.

In some embodiments, the backup node 130-1 may generate first digest information of the first data based on a predetermined digest rule, and generate the first metadata based on the first digest information. For example, the backup node 130-1 may divide the first data into a set of data blocks, and then generate respective digests corresponding to each data block in the set of data blocks. These digests may be included in the first digest information.

Dividing data into data blocks may be implemented in a plurality of manners. For example, in some embodiments, dividing data into data blocks can be implemented according to a predetermined size. Alternatively, dividing data into data blocks can be implemented in other manners.

Figure 3:
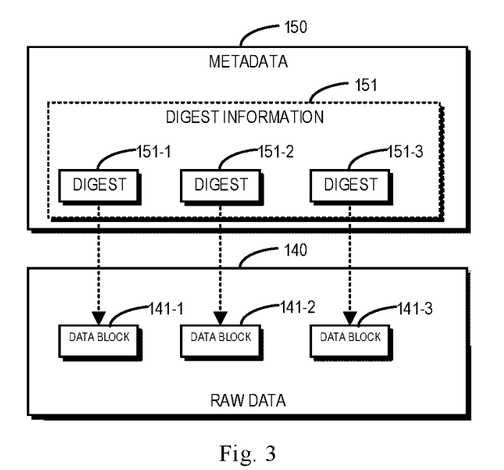
FIG. 3 illustrates a diagram of example raw data and example metadata corresponding thereto according to embodiments of the present disclosure.

FIG. 3 exemplarily illustrates a diagram of the raw data 140 and the generated metadata 150 according to embodiments of the present disclosure. As shown in FIG. 3, the raw data 140, for example, is divided into a plurality of data blocks 141-1, 141-2 and 141-3 (which are collectively referred to as data block 141). The backup node 130-1 may generate respective digests 151-1, 151-2 and 151-3 for the plurality of data blocks 141-1, 141-2 and 141-3. It would be appreciated that the manner for generating digests of the data blocks is not limited here, and instead, the digests of the data blocks may be generated in a plurality of manners according to a need of specific application environment. For example, digests may be generated based on an algorithm, such as MD5, SHA1, SHA256 or the like. Hereinafter, the digest is sometimes referred as "hash value." As shown in FIG. 3, the digest information 151 (i.e., first abstract information) including the plurality of digests 151-1, 151-2 and 151-3 may be recorded in the metadata 150. In addition to the digest information 151 as shown in FIG. 2, the metadata 151 may also record other information, such as a file structure, attributes, access information, a checksum and the like, associated with the original file or object.

At block 230, the backup node 130-1 stores the first metadata into the block chain system 120 where the backup node 130-1 is located.

In some embodiments, for example, as shown in FIG. 1, the backup node 130-1 may store the metadata 150 in the backup node 130-1, and send the metadata 150 to each of the backup nodes 130-2, 130-3 . . . 130-N, to store the copy of the metadata 150 in each backup node of the block chain system 120.

In some embodiments, the backup node 130-1 may pack and encrypt the metadata 150, and broadcast the packed and encrypted metadata 150 to other nodes 130 in the block chain system 120. When other backup nodes 130 (for example, running data protection programs supporting the same specific protocol) receive the packed and encrypted metadata 150, they attempt to record the metadata into the block chain.

In some embodiments, when each backup node 130 attempts to record the metadata into the block chain, a consensus algorithm, such as POW, may be executed in the entire block chain system 120 to implement a distributed trustless consensus. The POW algorithm is taken as an example of the consensus algorithm employed in the block chain system 120 herein. However, it would be appreciated that other consensus algorithms are also feasible in the embodiments of the present disclosure. Performing of the POW algorithm typically requires a large amount of computing resources, which is also referred to as "mining." The POW algorithm is performed to facilitate transactions in the block chain system. Typically, the mining operation deals with massive hash calculations to figure out a math puzzle, and the node solving the puzzle first (i.e., the winning node) obtains the right of creating blocks in a block chain system. In some embodiments, if it is received from the backup node 130-1 that a further backup node 130 of the metadata 150 wins a POW competition, it is indicated that blocks including the metadata 150 created by the further backup node 130 (as shown below in FIG. 6) is successfully confirmed by other backup nodes 130 in the block chain system 120. Details of the POW algorithm will be further described below with reference to FIGS. 6 and 7.

At block 240, the backup node 130-1 verifies integrity of the first data stored in the backup node 130-1 with the first metadata stored in the block chain system 120.

As described above, the digest information in the metadata 150 may be used to determine whether the data blocks in the raw data 140 is tampered with. However, since the metadata 150 in the backup node 130-1 per se is probably tampered with, the backup node 130-1 is also required to verify the integrity of the metadata 150 stored locally, prior to verifying the integrity of the raw data 140 with the digest information.

Figure 4:
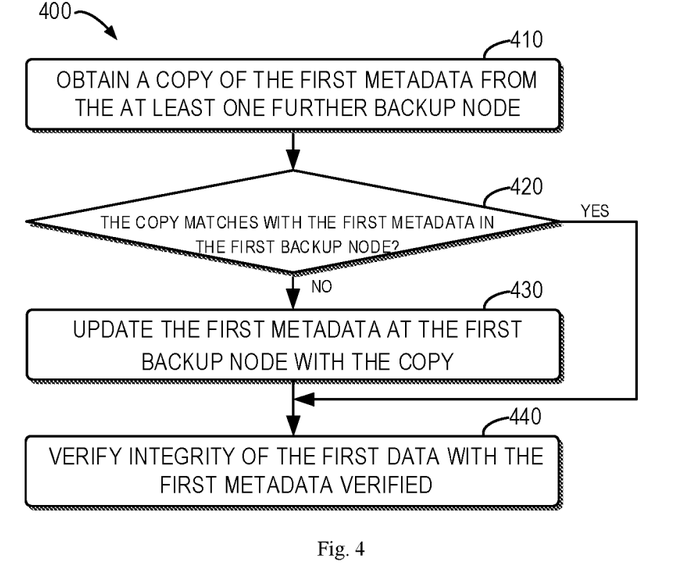
FIG. 4 illustrates a flowchart of an example method of verifying data integrity according to embodiments of the present disclosure.

FIG. 4 illustrates a flow chart of a method 400 of verifying integrity of data according to embodiments of the present disclosure. For example, the method 400 may act as an example implementation of the block 240 as shown in FIG. 2. It would be appreciated that the method 400 may include additional acts not shown and/or skip the acts as shown, and the scope of the present disclosure is not limited in this aspect.

At block 410, the backup node 130-1 obtains a copy of the metadata 150 from other backup nodes 130. In some embodiments, the copy may have been encrypted. Since the backup node 130-1 stores the metadata 150 locally, the backup node 130-1 may decrypt the obtained copy of the metadata 150.

At block 420, the backup node 130-1 may compare the obtained copy with the metadata 150 stored in the backup node 130-1. If the two are matched, it is indicated that the metadata 150 stored in the backup node 130-1 is not tampered with. If the two are mismatched, the backup node 130-1 may update the metadata 150 stored in the backup node 130-1 with the obtained copy, at 430.

Next, at block 440, the verified metadata 150 may be used to determine whether the first data is tampered with.

In some embodiments, in order to determine whether the first data is tampered with, the backup node 130-1 is required to re-calculate respective digests of all data blocks in the raw data 140, and then compare them with digests recorded in the metadata 150 stored locally. In some embodiments, in order to save computation resources and improve the efficiency of execution of data integrity check, the backup node 130-1 may outsource digest computing tasks in the data integrity check to other nodes in the block chain system 120.

Figure 5:
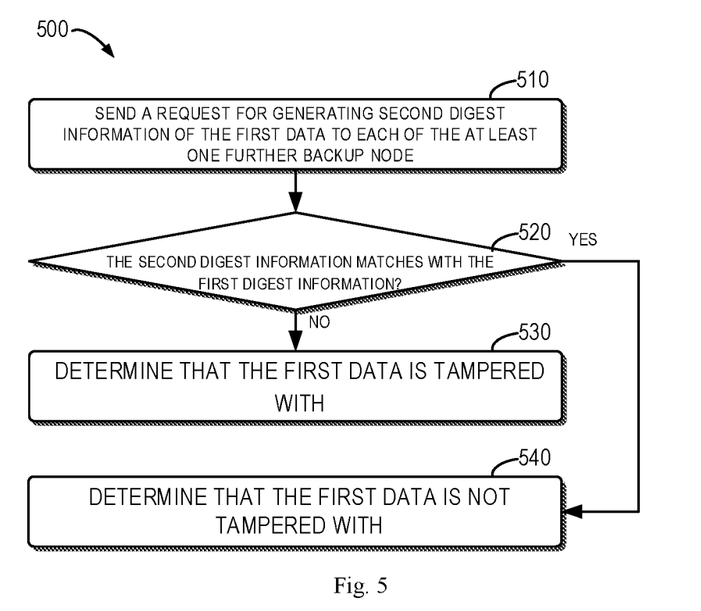
FIG. 5 illustrates a flowchart of a method of determining whether data is tampered with according to embodiments of the present disclosure.

FIG. 5 illustrates a flow chart of a method 500 of determining whether the first data is tampered with according to embodiments of the present disclosure. For example, the method 500 may act as an example implementation of the block 440 as shown in FIG. 4. It would be appreciated that the method 500 may also include additional acts not shown and/or skip the acts as shown, and the scope of the present disclosure is not limited in the aspect.

At block 510, the backup node 130-1 may send a request for generating second digest information of the first data to each backup node in other backup nodes 130.

In some embodiments, the backup node 130-1 may send the data blocks (for example, those having been encrypted) in the raw data 140, together with the request, to other nodes 130, so as to generate the second digest information. When other backup nodes 130 receive the request and the encrypted data blocks, they may calculate the respective digests (i.e., hash values) of these encrypted data blocks based on a predetermined digest rule. Then, these calculated hash values may be used to calculate a hash value $H_{pow}$, and the hash value $H_{pow}$ may be stored in the block head of the block created by the backup node, as an input of the POW algorithm. In some embodiments, for example, the hash value $h_{pow}$ may be calculated through the following Equation (1):

$$\text{sha1}(h_1+h_2+h_3+\ldots+h_i)=H_{pow} \quad \text{Equation (1)}$$

where, $h_1 \sim h_i$ represent calculation results of respective digests of the encrypted data blocks, respectively, which may be tagged and ordered according to timestamps. Although the hash value $H_{pow}$ is calculated with the sha1 algorithm in the Equation (1), it would be appreciated that this is provided only for illustration, without implying any limitation to the scope of the present disclosure. In other embodiments, other algorithms may be used to calculate the hash value $H_{pow}$.

In some embodiments, each backup node 130 may maintain a respective digest generation request pool, and receive continuously requests for generating digest information from other backup nodes 130. Each backup node 130 may order the received requests according to timestamps. When the number of requests in the digest generation request pool exceeds a certain threshold, the backup node 130 may start calculating the hash value $H_{pow}$. The calculated hash value $H_{pow}$ may be stored in the block head of the current block of the backup node, as an input of the POW algorithm.

Figure 6:
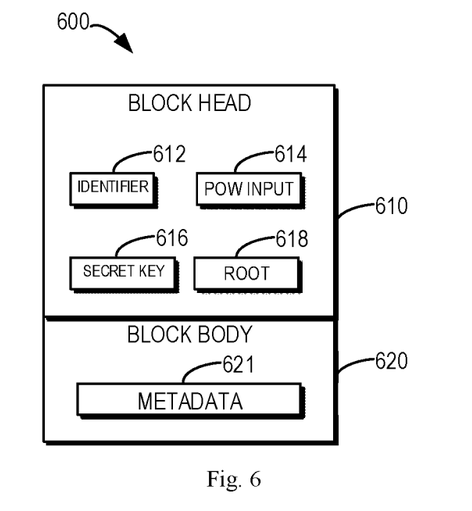
FIG. 6 illustrates a diagram of an example block according to embodiments of the present disclosure.

FIG. 6 illustrates a diagram of an example block 600 according to embodiments of the present disclosure. As shown, the hash value $H_{pow}$, for example, may be stored in a segment 614 in a block head 610 of the block 600. Moreover, other segments, such as an identifier 612, a secret key 616 and a root hash 618, may follow an existing bitcoin or Ethereum POW algorithm, so as to decide a winner capable of creating a new block through competition. In addition, as shown in FIG. 6, the block 600 further includes a block body 620 for storing metadata 621 to be recorded into the block chain.

In some embodiments, since it probably takes some time for a node in a block chain system to perform the above digest calculation, a difficulty level of a math puzzle in the POW algorithm may be adjusted to minimize duration of block creation. By taking the hash value $H_{pow}$ obtained from the calculated digests as the input of the POW algorithm, it can ensure that the backup node 130 in the block chain system 120 can receive continuously the digest generation request and calculate the respective digests for the POW competition. In this manner, the backup node 130-1 can be released from massive digest computing tasks.

Returning to FIG. 5, at block 520, the backup node 130-1 may compare the second digest information received from the backup node 130 winning the POW competition with the first digest information in the first metadata stored locally. If the two are not matched, the backup node 130-1 may determine that the first data is tampered with, at block 530. Otherwise, the backup node 130-1 may determine that the first data is not tampered with, at block 540.

Figure 7:
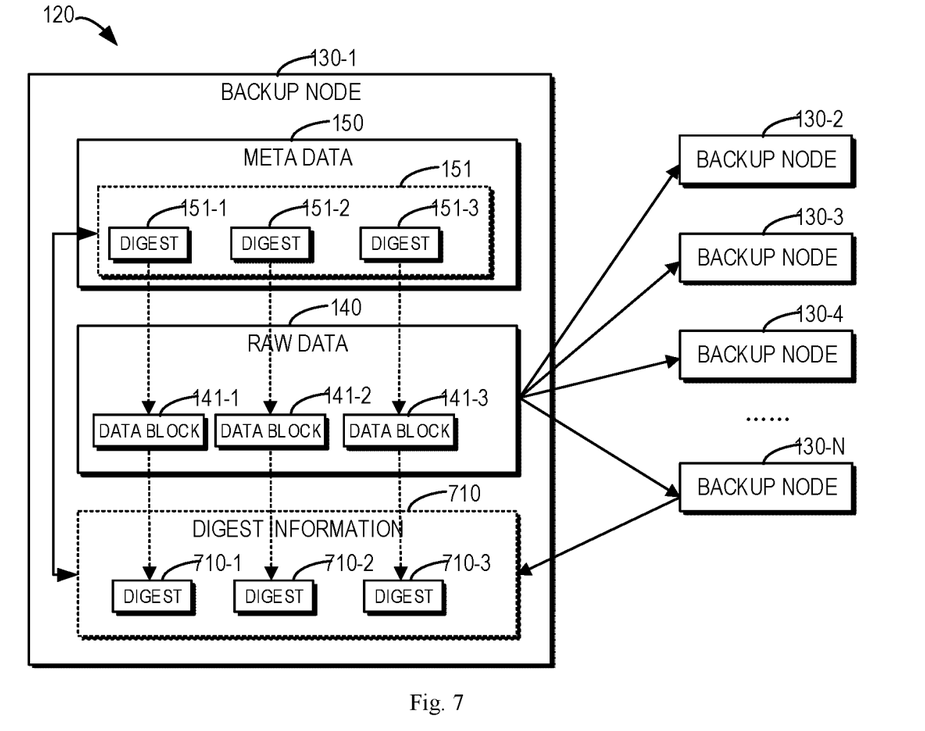
FIG. 7 illustrates a schematic diagram of an example data integrity check according to embodiments of the present disclosure.

FIG. 7 illustrates a diagram of a data integrity check according to embodiments of the present disclosure. As shown in FIG. 7, when performing the data integrity check, the backup node 130-1 may broadcast a request for recalculating respective digests of the plurality of data blocks 141 to other nodes 130 in the block chain system 120. Results of the calculation of the digests are used periodically to perform the POW algorithm for each block in the block chain. It is assumed here that the backup node 130-N wins the POW competition, i.e., the block created by the backup node 130-N is successfully confirmed by other nodes 130. It is simultaneously indicated that the digests calculated by the backup node 130-N reach a consensus in the block chain system 120. Subsequently, the backup node 130-N may return, to the backup node 130-1, respective calculated digests 710-1, 710-2 and 710-3 of the plurality of data blocks 141. The digests 710-1, 710-2 and 710-3 may be included in the second digest information 710. The backup node 130-1 determine whether respective data blocks 141 in the raw data 140 are tampered with by comparing the first digest information 151 and the second digest information 710.

In practice, there are massive possible methods to implement general idea on a consensus algorithm, such as POW, which are not limited to the example as described above. It would be appreciated that the example is provided merely for illustration, without any intention of limiting the scope of the present disclosure. Other consensus algorithms are also applicable to the embodiments of the present disclosure.

In this way, whenever a backup node completes backup for the application system once, the backup metadata may be recorded and confirmed in the block chain system in a short time (for example, a few minutes). As a result, the metadata stored in the block chain system is unchangeable. Due to this high security mechanism, the integrity check of the data can be more reliable.

In order to prevent a hacker or an intruder from tampering with metadata stored by a backup node locally, the backup node first attempts to match local metadata with metadata on a block chain when performing a data integrity check. If the match succeeds, it will outsource the digest computing tasks of the data block to other nodes in the processing as described above. If the match fails, it will synchronize the metadata in the block chain to the local storage for automatic recovery, and then outsources the digest computing tasks of the data block to other nodes. Therefore, this solution can detect any alteration to the backup data in time.

The example implementation according to the method of the present disclosure has been described above with reference to FIGS. 1 to 7, and implementations of the corresponding device will be described below.

In some embodiments, there is provided a device for backing up data. The device comprises: a first storage module configured, in response to receiving request for backing up first data from an application system, to store the first data in a first backup node; a first generation module configured to generate first metadata corresponding to the first data, the first metadata including first digest information of the first metadata; a second storage module configured to store the first metadata into a block chain system to which the first backup node belongs; and a verification module configured to verify integrity of the first data stored in the first backup node with the first metadata stored in the block chain system.

In some embodiments, the first generation module is further configured to: generate the first digest information based on a predetermined digest rule; and generate first metadata at least based on the first digest information.

In some embodiments, the first generation module is further configured to: divide the first data into a set of data blocks; generate respective digests for each data block in the set of data blocks; and generate the first digest information based on the respective digests.

In some embodiments, the block chain system includes a first backup node and at least one further backup node, and the second storage module is further configured to: store the first metadata into the first backup node; and send a copy of the first metadata to each of the at least one further backup node, to store the first metadata into the block chain system.

In some embodiments, the verification module is further configured to: obtain the copy of the first metadata from the at least one further backup node; determine, using the copy, whether the first metadata stored in the first backup node is tampered with; and determine whether the first data is tampered with, based on a result of the determination.

In some embodiments, the verification module is further configured to: determine whether the copy matches with the first metadata stored in the first backup node; in response to the copy mismatching with the first metadata node, determine that the first metadata stored in the first backup node is tampered with; and in response to determining the first metadata stored in the first backup node is tampered with, update the first metadata in the first backup node with the copy.

In some embodiments, the verification module is further configured to: send a request for generating second digest information of the first data to each of the at least one further backup node; in response to receiving, from one of the at least one further backup node, the second digest information reaching a consensus in the block chain system, match the received second digest information with the first digest information in the first metadata; in response to the received second digest information matching with the first digest information in the first metadata, determine that the first data is not tampered with; and in response to the received second digest information mismatching with the first digest information in the first metadata, determine that the first data is tampered with.

In some embodiments, the device includes a third storage module configured, in response to receiving, from a second backup node of the at least one further backup node, second metadata corresponding to second data at the second backup node, to store the second metadata in the first backup node.

In some embodiments, the device further includes a first sending module configured, in response to the second backup node receiving a request for obtaining the second metadata, to send the second metadata to the second backup node.

In some embodiments, the device further includes a second generation module configured, in response to receiving a request for generating digest information of the second data from the second backup node, to generate digest information of the second data; and a second sending module configured, in response to the generated digest information being confirmed by each of the at least one further backup node, to send the digest information to the second backup node.

Figure 8:
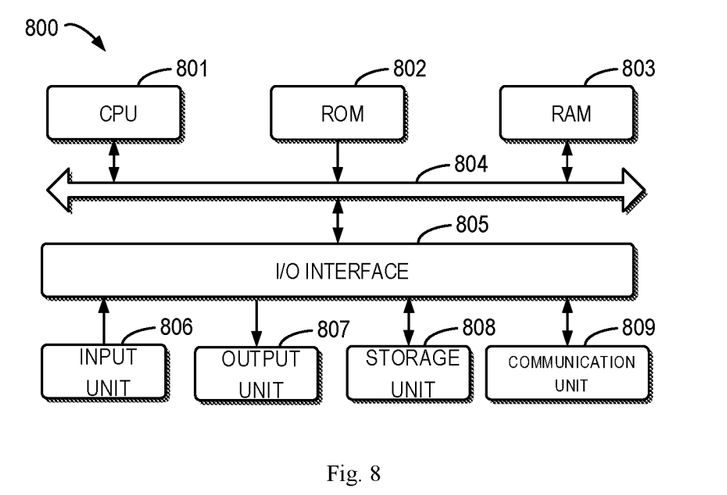
FIG. 8 illustrates a schematic block diagram of an example device that can be used to implement embodiments of the present disclosure.

FIG. 8 illustrates a schematic block diagram of an example device 800 that can be used to implement the embodiments of the present disclosure. For example, the storage node 130 as shown in FIG. 1 can be implemented by the device 800. As shown in FIG. 8, the device 800 includes a central processing unit (CPU) 801 which performs various appropriate actions and processing, based on computer program instructions stored in a read-only memory (ROM) 802 or computer program instructions loaded from a storage unit 808 to a random access memory (RAM) 803. The RAM 803 stores therein various programs and data required for operations of the device 800. The CPU 801, the ROM 802 and the RAM 803 are connected via a bus 804 with one another. An input/output (I/O) interface 805 is also connected to the bus 804.

A plurality of components in the device 800 are connected to the I/O interface 805: an input unit 806 such as a keyboard, a mouse and the like; an output unit 807 including various kinds of displays and loudspeakers, etc.; a storage unit 808 including a magnetic disk, an optical disk, and etc.; a communication unit 809 including a network card, a modem, and a wireless communication transceiver, etc. The communication unit 809 allows the device 800 to exchange information/data with other devices through a computer network such as the Internet and/or various kinds of telecommunications networks.

Various processes and processing described above, e.g., the method 200, 400 and/or 500, may be executed by the processing unit 801. For example, in some embodiments, the method 200, 400 and/or 500 may be implemented as a computer software program that is tangibly included in a machine-readable medium, e.g., the storage unit 808. In some embodiments, part or of the entirety of the computer programs may be loaded and/or mounted onto the device 800 via the ROM 802 and/or the communication unit 809. When the computer program is loaded to the RAM 803 and executed by the CPU 801, one or more steps of the method 200, 400 and/or 500 as described above may be performed.

The present disclosure may be a method, a device, a system, and/or a computer program product. The computer program product may include a computer-readable storage medium having computer readable program instructions thereon for causing a processor to carry out aspects of the present disclosure.

The computer-readable storage medium may be a tangible device that may retain and store instructions for use by an instruction execution device. The computer-readable storage medium may be, for example, but not limited to, an electronic storage device, a magnetic storage device, an optical storage device, an electromagnetic storage device, a semiconductor storage device, or any suitable combination thereof. More specific examples (a non-exhaustive list) of the computer readable storage medium would include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer-readable storage medium, or downloaded to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart and/or block diagrams of methods, device (systems), and computer program products according to embodiments of the present disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing device to produce a machine, such that the instructions, which are executed via the processor of the computer or other programmable data processing device, create means for implementing the functions/acts specified in the flowchart and/or block diagram block or blocks. These computer-readable program instructions may also be stored in a computer-readable storage medium that can direct a computer, a programmable data processing device, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing device, or other device to cause a series of operational steps to be performed on the computer, other programmable device or other device to produce a computer implemented process, such that the instructions which are executed on the computer, other programmable device, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which comprises one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of backing up data, comprising:
in response to receiving, from an application system, a request for backing up first data, storing the first data into a first backup node;
generating first metadata corresponding to the first data, the first metadata comprising first digest information of the first data, wherein generating the first metadata comprises:
generating the first digest information based on a predetermined digest rule; and
generating the first metadata at least based on the first digest information;
storing the first metadata into a block chain system to which the first backup node belongs; and
verifying integrity of the first data stored in the first backup node with the first metadata stored in the block chain system.

2. The method of claim 1, wherein generating the first digest information comprises:
dividing the first data into a set of data blocks;
generating respective digests for each data block in the set of data blocks; and
generating the first digest information based on the respective digests.

3. The method of claim 1, wherein the block chain system comprises the first backup node and at least one further backup node, and wherein storing the first metadata into the block chain system comprises:
storing the first metadata into the first backup node; and
sending a copy of the first metadata to each of the at least one further backup node, to store the first metadata into the block chain system.

4. The method of claim 3, wherein verifying the integrity of the first data comprises:
obtaining the copy of the first metadata from the at least one further backup node;
determining, with the copy, whether the first metadata stored in the first backup node is tampered with; and
determining whether the first data is tampered with based on a result of the determination.

5. The method of claim 4, wherein determining whether the first metadata in the first backup node is tampered with comprises:
determining whether the copy matches with the first metadata stored in the first backup node;
in response to the copy mismatching with the first metadata stored in the first backup node, determining that the first metadata stored in the first backup node is tampered with; and
in response to determining that the first metadata stored in the first backup node is tampered with, updating the first metadata at the first backup node with the copy.

6. The method of claim 4, wherein determining whether the first data is tampered with comprises:
sending a request for generating second digest information of the first data to each of the at least one further backup node;
in response to receiving, from one of the at least one further backup node, the second digest information reaching a consensus in the block chain system, matching the received second digest information with the first digest information in the first metadata;
in response to the received second digest information matching with the first digest information in the first metadata, determining that the first data is not tampered with; and
in response to the received second digest information mismatching with the first digest information in the first metadata, determining that the first data is tampered with.

7. The method of claim 1, further comprising:
in response to receiving, from a second backup node of at least one further backup node, second metadata corresponding to second data in the second backup node, storing the second metadata into the first backup node.

8. The method of claim 7, further comprising:
in response to receiving, from the second backup node, a request for obtaining the second metadata, sending the second metadata to the second backup node.

9. The method of claim 7, further comprising:
in response to receiving, from the second backup node, a request for generating digest information of the second data, generating the digest information of the second data; and
in response to the generated digest information being confirmed by each of the at least one further backup node, sending the digest information to the second backup node.

10. A device for backing up data, comprising:
at least one processing unit; and
at least one memory coupled to the at least one processing unit and storing instructions which, when executed by the at least one processing unit cause the device to perform operations, the operations comprising:
in response to receiving, from an application system, a request for backing up first data, storing the first data into a first backup node;
generating first metadata corresponding to the first data, the first metadata comprising first digest information of the first data, wherein generating the first metadata comprises:
generating the first digest information based on a predetermined digest rule; and
generating the first metadata at least based on the first digest information;
storing the first metadata into a block chain system to which the first backup node belongs; and
verifying integrity of the first data stored in the first backup node with the first metadata stored in the block chain system.

11. The device of claim 10, wherein generating the first digest information comprises:
dividing the first data into a set of data blocks;
generating respective digests for each data block in the set of data blocks; and
generating the first digest information based on the respective digests.

12. The device of claim 10, wherein the block chain system comprises the first backup node and at least one further backup node, and wherein storing the first metadata in the block chain system comprises:
storing the first metadata into the first backup node; and
sending a copy of the first metadata to each of the at least one further backup node, to store the first metadata in the block chain system.

13. The device of claim 12, wherein verifying the integrity of the first data comprises:
obtaining the copy of the first metadata from the at least one further backup node;

determining, with the copy, whether the first metadata stored in the first backup node is tampered with; and determining whether the first data is tampered with, based on a result of the determination.

14. The device of claim 13, wherein determining whether the first metadata in the first backup node is tampered with comprises:

determining whether the copy matches with the first metadata stored in the first backup node;

in response to the copy mismatching with the first metadata stored in the first backup node, determining that the first metadata stored in the first backup node is tampered with; and in response to determining that the first metadata stored in the first backup node is tampered with, updating the first metadata at the first backup node with the copy.

15. The device of claim 13, wherein determining whether the first data is tampered with comprises:

sending a request for generating second digest information of the first data to each of the at least one further backup node;

in response to receiving, from one of the at least one further backup node, the second digest information reaching a consensus in the block chain system, matching the received second digest information with the first digest information in the first metadata;

in response to the received second digest information matching with the first digest information in the first metadata, determining that the first data is not tampered with; and in response to the received second digest information mismatching with the first digest information in the first metadata, determining that the first data is tampered with.

16. The device of claim 10, wherein the operations further comprise:

in response to receiving, from a second backup node of at least one further backup node, second metadata corresponding to second data in the second backup node, storing the second metadata into the first backup node.

17. The device of claim 16, wherein the operations further comprise:

in response to receiving, from the second backup node, a request for obtaining the second metadata, sending the second metadata to the second backup node.

18. The device of claim 16, wherein the operations further comprise:

in response to receiving, from the second backup node, a request for generating digest information of the second data, generating the digest information of the second data; and in response to the generated digest information being confirmed by each of the at least one further backup node, sending the digest information to the second backup node.

19. A computer program product being tangibly stored in a non-transient computer storage medium and comprising machine-executable instructions which, when executed by a device, cause the device to perform operations, the operations comprising:

in response to receiving, from an application system, a request for backing up first data, storing the first data into a first backup node;

generating first metadata corresponding to the first data, the first metadata comprising first digest information of the first data, wherein generating the first metadata comprises:

generating the first digest information based on a predetermined digest rule; and generating the first metadata at least based on the first digest information;

storing the first metadata into a block chain system to which the first backup node belongs; and verifying integrity of the first data stored in the first backup node with the first metadata stored in the block chain system.

* * * * *